(12) United States Patent
Kigami et al.

(10) Patent No.: US 10,995,247 B2
(45) Date of Patent: May 4, 2021

(54) SILICONE ADHESIVE COMPOSITION, ADHESIVE TAPE, AND METHOD FOR PRODUCING ADHESIVE TAPE

(71) Applicant: NITTO DENKO CORPORATION, Ibaraki (JP)

(72) Inventors: Hiroki Kigami, Osaka (JP); Yoshinori Watanabe, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 300 days.

(21) Appl. No.: 15/116,462

(22) PCT Filed: Jan. 8, 2015

(86) PCT No.: PCT/JP2015/000063
§ 371 (c)(1),
(2) Date: Aug. 3, 2016

(87) PCT Pub. No.: WO2015/122112
PCT Pub. Date: Aug. 20, 2015

(65) Prior Publication Data
US 2017/0009115 A1   Jan. 12, 2017

(30) Foreign Application Priority Data

Feb. 13, 2014   (JP) .............................. JP2014-025441

(51) Int. Cl.
*C09J 183/04* (2006.01)
*C08K 5/14* (2006.01)
(Continued)

(52) U.S. Cl.
CPC .......... *C09J 183/04* (2013.01); *C08K 5/0025* (2013.01); *C08K 5/14* (2013.01); *C08K 5/56* (2013.01);
(Continued)

(58) Field of Classification Search
CPC ...... C09J 183/04; C09J 183/06; C09J 183/08; C09J 183/10; C09J 183/12; C09J 183/14;
(Continued)

(56) References Cited

U.S. PATENT DOCUMENTS 4,034,140 A * 7/1977 Przybyla ................. C08L 83/04
428/447
4,889,576 A   12/1989 Suganuma et al.
(Continued)

FOREIGN PATENT DOCUMENTS

EP    0529841 A1 * 3/1993   ............ C09J 183/14
JP    4-211487       8/1992
(Continued)

OTHER PUBLICATIONS

Extended European Search Report issued for corresponding European Patent Application No. 15749428.7, dated Sep. 1, 2017, 6 pages.
(Continued)

*Primary Examiner* — Scott R. Walshon
(74) *Attorney, Agent, or Firm* — Hamre, Schumann, Mueller & Larson, P.C.

(57) ABSTRACT

A silicone adhesive composition includes 100 parts by weight of a peroxide-curable silicone, 1.2 to 3.2 parts by weight of an organic peroxide curing agent, and 2 to 9 parts by weight of an addition reaction-curable silicone rubber. An adhesive tape includes a base and an adhesive layer placed on the base, the adhesive layer being formed from the above silicone adhesive composition. The adhesive composition exhibits high load bearing capacity even in higher-temperature environments than ever before. The adhesive tape exhibits high load bearing capacity and good shelf life even in such high-temperature environments.

1 Claim, 2 Drawing Sheets

(51) Int. Cl.
*C09J 7/38* (2018.01)
*C09J 7/30* (2018.01)
*C09J 7/21* (2018.01)
*C09J 7/20* (2018.01)
*C08K 5/56* (2006.01)
*C08L 83/00* (2006.01)
*C08K 5/00* (2006.01)

(52) U.S. Cl.
CPC ............... *C08L 83/00* (2013.01); *C09J 7/205* (2018.01); *C09J 7/21* (2018.01); *C09J 7/30* (2018.01); *C09J 7/38* (2018.01); *C09J 2301/302* (2020.08); *C09J 2301/40* (2020.08); *C09J 2301/408* (2020.08); *C09J 2400/143* (2013.01); *C09J 2400/263* (2013.01); *C09J 2427/006* (2013.01); *C09J 2483/00* (2013.01)

(58) Field of Classification Search
CPC .... C09J 183/16; C09D 183/04; C09D 183/06; C09D 183/08; C09D 183/10; C09D 183/12; C09D 183/14; C09D 183/16; C08L 83/04; C08L 83/06; C08L 83/08; C08L 83/10; C08L 83/12; C08L 83/14; C08L 83/16; C08L 83/00; C09K 5/0025
See application file for complete search history.

(56) References Cited

U.S. PATENT DOCUMENTS

| | | | |
|---|---|---|---|
| 4,891,393 A | 1/1990 | Hirai et al. | |
| 5,006,372 A | 4/1991 | Wolfer et al. | |
| 5,100,976 A | 3/1992 | Hamada et al. | |
| 5,506,288 A | 4/1996 | Lin et al. | |
| 5,602,214 A | 2/1997 | Lin et al. | |
| 2002/0013386 A1* | 1/2002 | Aoki | C08F 283/12 523/176 |
| 2004/0041131 A1* | 3/2004 | Fukushima | C09J 9/02 252/500 |
| 2010/0104865 A1* | 4/2010 | Mizuno | C09J 183/04 428/355 R |
| 2014/0179870 A1* | 6/2014 | Kondo | C08L 83/00 524/866 |

FOREIGN PATENT DOCUMENTS

| | | |
|---|---|---|
| JP | H0517729 | 1/1993 |
| JP | 8-032828 | 3/1996 |
| JP | 2004-123769 | 4/2004 |
| JP | 2010-006918 | 1/2010 |

OTHER PUBLICATIONS

Datasheet for NITOFLON 973UL-S, Nitto Denko Corporation, available at https://www.nitto.com/us/en/others/products/file/datasheet/NJ_No973UL_EN.pdf (Year: 2014) 2 pages.
Datasheet for NITOFLON 973SC, Nitto Denko Corporation, available at https://www.nitto.cn/cn/zhc/others/products/group/file/datasheet/NJ_NO.973SC_EN.pdf (Year: 2013) 2 pages.
Non-Final Office Action issued for U.S. Appl. No. 16/212,217, dated Jul. 24, 2020, 27 pages.
Machine translation of JPH0517729 (Year: 1993) 5 pages.

* cited by examiner (a)

(b)

SILICONE ADHESIVE COMPOSITION, ADHESIVE TAPE, AND METHOD FOR PRODUCING ADHESIVE TAPE

TECHNICAL FIELD

The present invention relates to a silicone adhesive composition, an adhesive tape, and a method for producing an adhesive tape.

BACKGROUND ART

Known adhesives (pressure-sensitive adhesives) include adhesives based on silicones (silicone adhesives). Silicone adhesives are superior to acrylic adhesives and rubber adhesives in properties such as heat resistance, cold resistance, weather resistance, chemical resistance, and electrical insulation, and adhere well to various adherends. Silicone adhesives are thus used in various adhesive tapes such as heat-resistant tapes, electrically-insulating tapes, heat sealing tapes, and plating masking tapes. When an adhesive tape is used in an application that requires heat resistance, a base with excellent heat resistance such as a fluororesin base or a glass cloth base impregnated with a fluororesin is often used with the silicone adhesives. Silicone adhesives include peroxide-curable adhesives and addition reaction-curable adhesives.

To increase the heat resistance of an adhesive tape, not only the properties of a base but also those of a silicone adhesive need to be improved. In view of applications of the adhesive tape, it is desired to improve, in particular, the ability to maintain the adhesive strength in high-temperature environments (load bearing capacity in high-temperature environments) among the properties of the silicone adhesive. Patent Literature 1 (JP 2010-6918 A) discloses a peroxide-curable silicone adhesive composition, the composition capable of maintaining its adhesive strength even at a high temperature above 150° C.

CITATION LIST

Patent Literature

Patent Literature 1: JP 2010-006918 A

SUMMARY OF INVENTION

Technical Problem

An object of the present invention is to provide: a silicone adhesive composition that exhibits high load bearing capacity even in higher-temperature environments than ever before; and an adhesive tape that exhibits high load bearing capacity and good shelf life even in such high-temperature environments.

Solution to Problem

The silicone adhesive composition according to the present invention includes 100 parts by weight of a peroxide-curable silicone, 1.2 to 3.2 parts by weight of an organic peroxide curing agent, and 2 to 9 parts by weight of an addition reaction-curable silicone rubber.

The adhesive tape according to the present invention includes a base and an adhesive layer placed on the base, the adhesive layer being formed from the above silicone adhesive composition according to the present invention.

The method for producing an adhesive tape according to the present invention includes heating an original tape including a base and the above silicone adhesive composition according to the present invention placed on the base and thereby forming the composition into an adhesive layer, so as to obtain an adhesive tape including the base and the adhesive layer placed on the base.

In another aspect, the method for producing an adhesive tape according to the present invention includes: heating a transfer base on which the silicone adhesive composition according to the present invention is placed and thereby forming the composition into an adhesive layer; and transferring the adhesive layer from the transfer base to a base so as to obtain an adhesive tape including the base and the adhesive layer placed on the base.

Advantageous Effects of Invention

With the present invention, it is possible to obtain: a silicone adhesive composition that exhibits high load bearing capacity even in higher-temperature environments than ever before; and an adhesive tape that exhibits high load bearing capacity and good shelf life even in such high-temperature environments.

DESCRIPTION OF EMBODIMENTS

Figure 1:
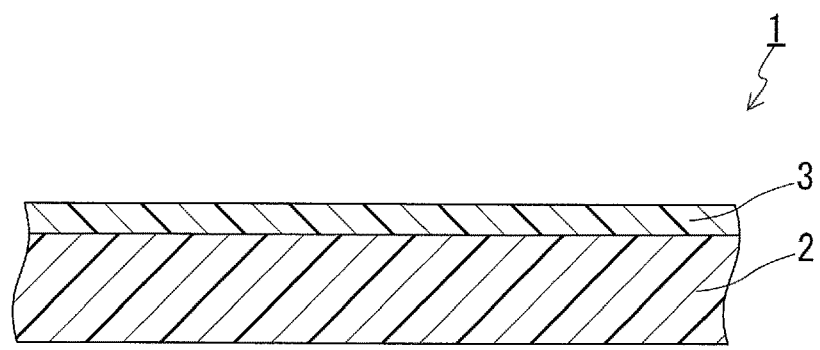
FIG. 1 is a cross-sectional view schematically showing an example of the adhesive tape according to the present invention.

A silicone adhesive composition according to the present invention includes 100 parts by weight of a peroxide-curable silicone, 1.2 to 3.2 parts by weight of an organic peroxide curing agent, and 2 to 9 parts by weight of an addition reaction-curable silicone rubber. This composition exhibits high load bearing capacity even in higher-temperature environments than ever before, such as in an environment with a temperature above 200° C. Additionally, when an adhesive tape is formed using this composition, the adhesive tape exhibits high load bearing capacity and good shelf life even in such high-temperature environments as mentioned above.

The peroxide-curable silicone includes a peroxide-curable silicone rubber and/or a partial condensate thereof. The silicone rubber may be a raw rubber (gum). The peroxide-curable silicone may include at least one selected from a silicone resin and a partial condensate thereof. The composition of the peroxide-curable silicone is not particularly limited, as long as the peroxide-curable silicone includes a peroxide-curable silicone rubber and/or a partial condensate thereof.

The peroxide-curable silicone rubber is not particularly limited, and is, for example, an organopolysiloxane having dimethylsiloxane as a main constitutional unit. A hydroxy group or another functional group may be introduced into the organopolysiloxane where necessary. A specific example of the organopolysiloxane is dimethylpolysiloxane. The weight-average molecular weight of the organopolysiloxane is typically 180,000 or more, preferably 280,000 to 1,000, 000, and more preferably 500,000 to 900,000. The peroxide-curable silicone may include two or more peroxide-curable silicone rubbers or may include two or more partial condensates of peroxide-curable silicone rubbers.

The silicone resin is not particularly limited and is, for example, an organopolysiloxane having at least one unit selected from an M unit ($R_3SiO_{1/2}$), a Q unit ($SiO_2$), a T unit ($RSiO_{3/2}$), and a D unit ($R_2SiO$). Rs in these units are each independently a monovalent hydrocarbon group or a hydroxy group. A functional group may be introduced into this copolymer where necessary, and the introduced functional group may be one that undergoes a cross-linking reaction. It is preferable for the silicone resin to be a so-called MQ resin constituted by the M units and the Q units.

When the silicone resin is an MQ resin, a molar ratio between the content of the M units and the content of the Q units in the resin is, for example, 0.3:1 to 1.5:1, preferably 0.5:1 to 1.3:1, as expressed by M units:Q units.

The peroxide-curable silicone may include two or more silicone resins or may include two or more partial condensates of silicone resins.

When the peroxide-curable silicone includes a silicone resin, the weight ratio between the silicone rubber and the silicone resin in the silicone is not particularly limited and is, for example, 100:110 to 100:220, preferably 100:160 to 100:190, as expressed by silicone rubber:silicone resin. When the peroxide-curable silicone includes a partial condensate of a silicone rubber and/or a partial condensate of a silicone resin, the above weight ratio can be determined from the weights of the silicone rubber and the silicone resin that have yet to undergo partial condensation.

The organic peroxide curing agent is not particularly limited. Examples of the curing agent include benzoyl peroxide, t-butyl peroxybenzoate, dicumyl peroxide, t-butylcumyl peroxide, di-t-butyl peroxide, 2,5-dimethyl-2,5-di(t-butylperoxy)hexane, 2,4-dichlorobenzoyl peroxide, 1,1-bis(t-butylperoxy)-3,3,5-trimethylcyclohexane, and 2,5-dimethyl-2,5-di(t-butylperoxy)hexyne-3.

The amount of the organic peroxide curing agent included in the silicone adhesive composition according to the present invention is 1.2 to 3.2 parts by weight, preferably 1.4 to 3.0 parts by weight, per 100 parts by weight of the peroxide-curable silicone. When the amount of the curing agent falls below 1.2 parts by weight which is the lower limit, the bond strength of the adhesive composition becomes insufficient. When the amount of the curing agent exceeds 3.2 parts by weight which is the upper limit, the load bearing capacity in the high-temperature environments is reduced, which results in, for example, a failure to obtain an adhesive tape that exhibits high load bearing capacity and good shelf life even in the high-temperature environments.

The silicone adhesive composition according to the present invention may include two or more organic peroxide curing agents.

The silicone adhesive composition according to the present invention includes an addition reaction-curable silicone rubber. The silicone rubber may be a raw rubber (gum). The addition reaction-curable silicone rubber is not particularly limited, and a well-known addition reaction-curable silicone rubber can be used.

The amount of the addition reaction-curable silicone rubber included in the silicone adhesive composition according to the present invention is 2 to 9 parts by weight, preferably 3 to 7 parts by weight, per 100 parts by weight of the peroxide-curable silicone. When the amount of the addition reaction-curable silicone rubber is in this range, the silicone adhesive composition can exhibit high load bearing capacity even in the high-temperature environments. When the amount of the addition reaction-curable silicone rubber falls below 2 parts by weight which is the lower limit, the load bearing capacity in the high-temperature environments is reduced and, in particular, displacement of an adhesive surface becomes more likely to occur in the high-temperature environments. When the amount of the addition reaction-curable silicone rubber exceeds 9 parts by weight which is the upper limit, the load bearing capacity in the high-temperature environments is reduced and, in particular, the bond strength in the high-temperature environments is reduced.

The addition reaction-curable silicone rubber is not particularly limited, and a well-known addition reaction-curable silicone rubber can be used. The addition reaction-curable silicone rubber contains an addition-polymerizable group, and this group is, for example, a vinyl group.

The silicone adhesive composition according to the present invention may include two or more addition reaction-curable silicone rubbers.

It is preferable that the addition reaction-curable silicone rubber, when cured, have an elastic modulus (storage elastic modulus G') of 0.01 MPa or more and 1 MPa or less at ordinary temperature (25° C.) and have an elastic modulus of 0.01 MPa or more and 1 MPa or less at 200° C. It is more preferable that the elastic modulus be 0.1 MPa or more and 1 MPa or less at ordinary temperature and be 0.1 MPa or more and 1 MPa or less at 200° C. The storage elastic modulus G' can be measured with a rheometer. A specific example of the measurement method is to subject a measurement object to shaping or lamination so that it attains a thickness of about 1.5 mm and then perform measurement on the object using a rheometer (for example, Advanced Rheometric Expansion System (ARES) manufactured by Rheometric Scientific Inc.) over the temperature range from −20° C. to 250° C. under the following measurement conditions: shear mode, frequency=1 Hz, temperature increase rate=5° C./min.

The silicone adhesive composition according to the present invention can, where necessary, include another component other than the peroxide-curable silicone, the organic peroxide curing agent, and the addition reaction-curable silicone rubber, and examples of the another component include an additive, a catalyst, a cross-linking agent, and a solvent for adjusting the viscosity of the adhesive composition. The catalyst is, for example, a platinum catalyst. The cross-linking agent is, for example, a siloxane-based cross-linking agent having a SiH group.

The gel fraction of a cured product of the silicone adhesive composition according to the present invention (the gel fraction of an adhesive layer obtained from the silicone adhesive composition according to the present invention) is preferably 40 to 60% and more preferably 45 to 55%. The gel fraction of a cured product of the adhesive composition can be determined, for example, by the following procedures using immersion to dissolve components of the adhesive layer other than the gel.

About 0.1 g of a cured product of the adhesive composition, such as an adhesive layer taken from an adhesive tape, was wrapped by a porous polytetrafluoroethylene (PTFE) sheet with an average pore diameter of 0.2 μm (an example of which is NTF 1122 manufactured by NITTO DENKO CORPORATION), and the wrapping sheet is then bound with a kite string to prepare a measurement sample. Next, the weight of the measurement sample prepared is measured, and the measured weight is defined as a pre-immersion weight C. The pre-immersion weight C corresponds to the total weight of the adhesive layer, the polytetrafluoroethylene sheet, and the kite string. The total weight of the PTFE sheet and the kite string is separately measured beforehand and is defined as a wrapping weight B. Next, the measurement sample is placed in a toluene-filled container having an inner volume of 50 mL and allowed to stand at 23° C. for 7 days. Next, the interior of the container, together with the measurement sample, is washed with ethyl acetate. The measurement sample is then taken out of the container, moved into an aluminum cup, and dried at 130° C. for 2 hours to remove ethyl acetate. Next, the weight of the measurement sample from which ethyl acetate has been removed is measured, and the measured weight is defined as a post-immersion weight A. The gel fraction can be determined by the following equation.

Gel fraction(weight %)=(A−B)/(C−B)×100

The silicone adhesive composition according to the present invention can be produced, for example, by mixing the peroxide-curable silicone, the organic peroxide curing agent, and the addition reaction-curable silicone rubber. The order in which these components are added is not limited. In this mixing, an additive as mentioned above may be added where necessary. When the silicone is composed of a plurality of materials, the silicone may be formed using the materials and then mixed with the other components, or the materials themselves may be mixed with the other components without formation of the silicone so as to produce the silicone adhesive composition according to the present invention.

The silicone adhesive composition according to the present invention can be used for an adhesive layer of an adhesive tape. In this case, it is possible to obtain an adhesive tape that exhibits high load bearing capacity and good shelf life in the high-temperature environments. Such an adhesive tape is suitable, for example, for use in heat sealing, more particularly for use as a release tape (heat sealing tape) for preventing direct contact between an object to be sealed and a heating portion of a heat sealing apparatus. The heat sealing tape, which is used by being attached to the heating portion of the apparatus, is usually subjected to a great force acting in such a direction as to laterally displace the tape on the heating portion every time the sealing operation is repeated. In addition, replacement of the heat sealing tape on the heating portion, which is needed after a certain number of heat sealing operations, may be immediately followed by starting heat sealing again by heating of the heating portion, giving rise to peeling of an edge of a tape newly attached to the heating portion.

When used in an adhesive tape, the silicone adhesive composition according to the present invention is a silicone adhesive composition for (an adhesive layer of) an adhesive tape. The silicone adhesive composition according to the present invention is not limited to use in (an adhesive layer of) an adhesive tape and can be used in the same applications as conventional silicone adhesive compositions.

FIG. 1 shows an example of the adhesive tape according to the present invention. An adhesive tape 1 of FIG. 1 includes a base 2 and an adhesive layer 3 placed on the base 2, the adhesive layer 3 being formed from the silicone adhesive composition according to the present invention. The adhesive layer 3 is a cured layer of the silicone adhesive composition according to the present invention.

As the base there can be used any of various bases conventionally used in adhesive tapes. In view of the heat resistance required of adhesive tapes, it is preferable to use a base made of a heat-resistant material. Examples of the heat-resistant material include polytetrafluoroethylene (PTFE), polyvinylidene fluoride, polyvinyl fluoride, ethylene-tetrafluoroethylene copolymer, a glass cloth, a glass cloth impregnated with PTFE, and polyimide. In an example, the base is a glass cloth base impregnated with PTFE. In this case, the heat resistance of the adhesive tape and the releasability of its surface (an exposed surface of the base) opposite from the adhesive surface can be particularly high. Such an adhesive tape having high releasability is particularly suitable for use on a heating portion for heat sealing (for use as a heat sealing tape).

The glass cloth base impregnated with PTFE can be formed, for example, by immersing a glass cloth in a PTFE dispersion and then heating the glass cloth to a temperature equal to or higher than the melting point of PTFE.

The thickness of the base is not particularly limited and is, for example, about 0.005 to 0.3 mm.

The adhesive tape may be in the form of a roll obtained by rolling up a sheet-shaped base on which the above adhesive layer is placed.

The adhesive tape according to the present invention can be produced, for example, by the method for producing an adhesive tape according to the present invention.

In the method for producing an adhesive tape according to the present invention, the silicone adhesive composition according to the present invention is applied onto a base or a transfer base to form a coating layer made of the composition. For the formation of the coating layer, a well-known coating technique can be used. Examples of the coating technique include: coating using various coaters such as a comma coater, a lip coater, a roll coater, a die coater, a knife coater, a blade coater, a rod coater, a kiss coater, and a gravure coater; screen coating; immersion coating; and cast coating. It is preferable to apply the silicone adhesive composition so that the thickness of the coating layer is about 2 to 200 µm, particularly about 10 to 100 µm.

Figure 2:
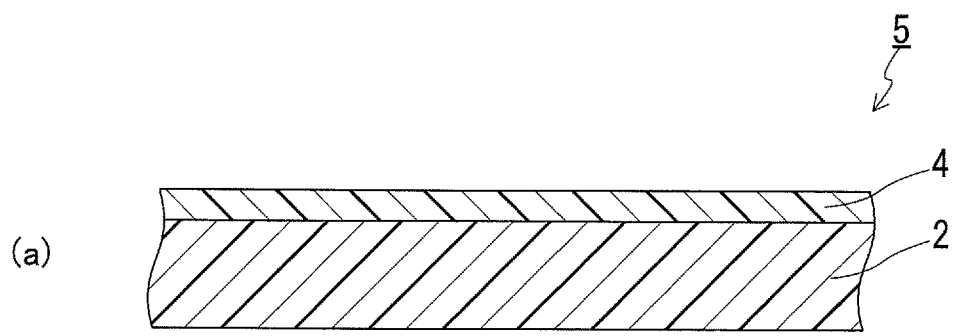
FIG. 2 is a diagram schematically showing the steps of an example of the method for producing an adhesive tape according to the present invention.
Figure 2:
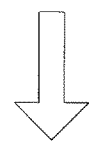
Figure 2:
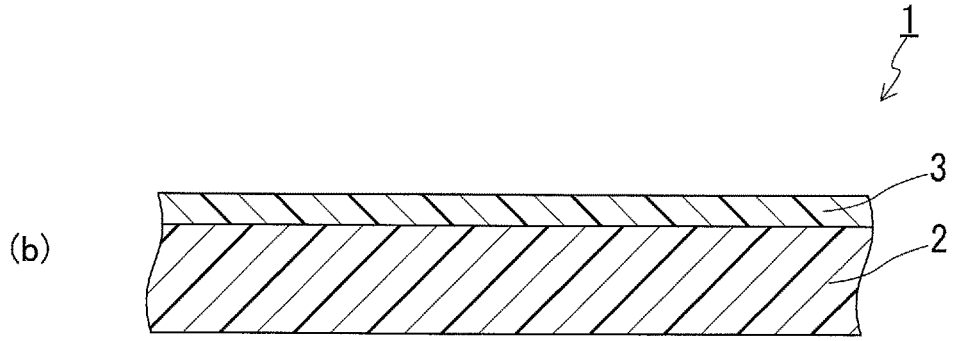

FIG. 2 shows an example of the method for producing the adhesive tape according to the present invention by applying a silicone adhesive composition onto a base. In the example shown in FIG. 2, the silicone adhesive composition according to the present invention is applied onto the base 2 to form a coating layer 4 (see (a)), then an original tape 5 having the base 2 and the coating layer 4 on the base 2 is heated to form the coating layer 4 into the adhesive layer 3, and thus the adhesive tape 1 is obtained (see (b)).

Figure 3:
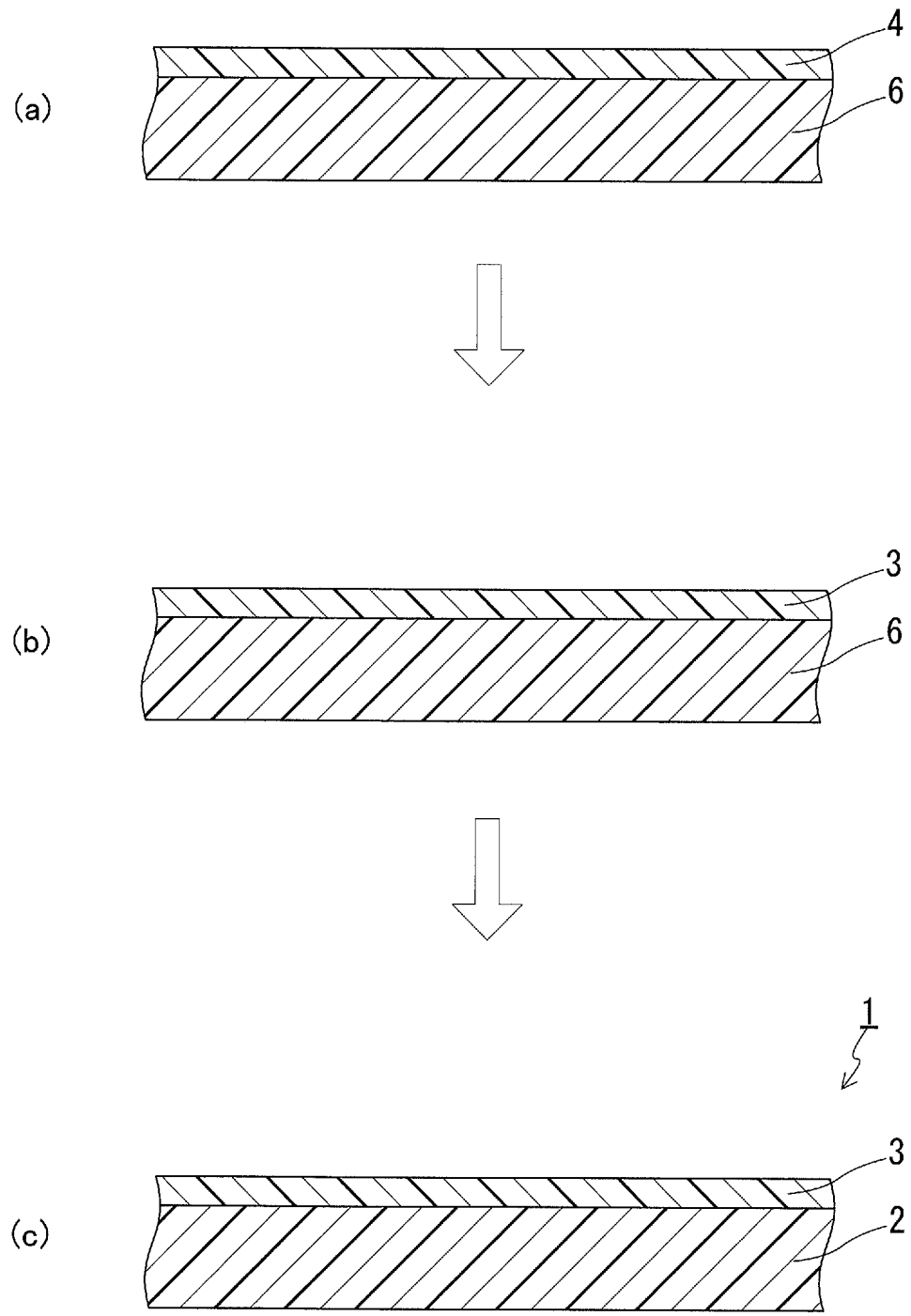
FIG. 3 is a diagram schematically showing the steps of another example of the method for producing an adhesive tape according to the present invention.

FIG. 3 shows an example of the method for producing the adhesive tape according to the present invention by applying a silicone adhesive composition onto a transfer base. In the example shown in FIG. 3, the silicone adhesive composition according to the present invention is applied onto a transfer base 6 to form the coating layer 4 (see (a)), and then the transfer base 6 and the coating layer 4 on the transfer base 6 are heated to form the coating layer 4 into the adhesive layer 3 (see (b)). Next, the adhesive layer 3 formed is transferred from the transfer base 6 to the base 2, and thus the adhesive tape 1 is obtained (see (c)).

The base is as described above for the adhesive tape according to the present invention.

As the transfer base there can be used, for example, a film or a sheet made of polyimide, polyethylene, or polypropylene. It is preferable that the surface of the transfer base onto which the adhesive composition is applied be provided with a coating for release which is formed of, for example, fluorinated silicone.

When the adhesive composition is applied onto a base, the surface of the base onto which the composition is applied may be surface-treated beforehand. The surface treatment of the base is, for example, a treatment for improving the bonding property (anchoring force) between the surface of the base and the adhesive composition applied on the surface.

Subsequently, the coating layer formed is heat-treated at a temperature at which curing of the peroxide-curable silicone and the addition reaction-curable silicone rubber contained in the layer proceeds, and thus the adhesive layer is formed. The temperature of the heat treatment is not limited as long as it is a temperature which allows curing of both the silicone and the silicone rubber to proceed. The temperature is, for example, 100 to 250° C. and preferably 150 to 250° C. The length of time of the heat treatment is, for example, 30 seconds to 10 minutes.

The heat treatment converts the coating layer to the adhesive layer. Thus, if the coating layer is formed first on a base, an adhesive tape including the base and an adhesive layer placed on the base can be obtained in the above manner. In the case where the coating layer is formed on a transfer base, an adhesive tape including a base and an adhesive layer placed on the base can be obtained by the formation of the adhesive layer by heat treatment, followed by transfer of the formed adhesive layer from the transfer base to the base.

EXAMPLES

Hereinafter, the present invention will be described in more detail with reference to examples. The present invention is not limited to the examples given below.

Methods for evaluating adhesive tapes fabricated in the examples will be described first.

[Amount of Displacement in Shear Direction in High-Temperature Environment]

Each of the adhesive tapes fabricated was cut to obtain a 10-mm-wide test specimen, which was then attached to a lower edge portion of a vertically-held stainless steel plate so that the adhesive area was 10 mm×20 mm. This was done in such a manner that the length direction of the test specimen coincided with the vertical direction and that the lower edge of the test specimen was not in contact with the stainless steel plate. Next, a load of 500 g acting vertically downward was applied to the lower edge of the test specimen, and the specimen and the plate were kept as such at 230° C. for 1 hour, after which the amount of displacement of the test specimen was evaluated with a microscope.

[Amount of Peel in 90° Direction in High-Temperature Environment]

Each of the adhesive tapes fabricated was cut to obtain a 10-mm-wide test specimen, which was then attached to a stainless steel plate so that the adhesive area was 10 mm×20 mm. This was done in such a manner that one edge of the test specimen was not in contact with the stainless steel plate. Next, a load of 20 g acting in a direction perpendicular to the surface of the stainless steel plate was applied to the one edge of the test specimen, and the specimen and the plate were quickly heated to 250° C. and kept as such for 1 hour, after which the amount of peel of the test specimen was evaluated.

[Storage Test]

Each of the adhesive tapes fabricated was stored at 60° C. for 7 days, then cooled to ordinary temperature, and subjected to the above evaluations of the amount of displacement in the shear direction in a high-temperature environment and the amount of peel in the 90° direction in a high-temperature environment.

Example 1

There were mixed: 100 parts by weight of dimethylpolysiloxane (weight-average molecular weight=700,000, raw rubber-like form); 170 parts by weight of an MQ resin as a silicone resin (weight-average molecular weight=5500), the MQ resin consisting of 44 mol % of $(CH_3)_3SiO_{1/2}$ units corresponding to the M units and 56 mol % of $SiO_2$ units corresponding to the Q units; and toluene. Next, the resulting mixture was held at 100 to 120° C. for 4 hours to allow the dimethylpolysiloxane and the MQ resin to undergo partial condensation. After that, toluene was further added to adjust the content of solids (non-volatile components). This yielded a toluene solution A (concentration of 60 weight %) of the dimethylpolysiloxane, the MQ resin, and partial condensates of the dimethylpolysiloxane and the MQ resin. The solution A obtained was viscous, colorless, and transparent.

Next, there were mixed 100 parts by weight of the obtained toluene solution A, 0.96 parts by weight (in terms of solid content) of a xylene solution of benzoyl peroxide as an organic peroxide curing agent (NYPER BMT-K40, manufactured by NOF CORPORATION and having a solid content of 40 weight %), and 5 parts by weight of RTV 4086 (manufactured by Dow Corning Toray Co., Ltd.) as an addition reaction-curable silicone rubber. Further, the concentration was adjusted with toluene, and thus a silicone adhesive composition having a concentration of 40 weight % was obtained.

Next, the silicone adhesive composition obtained was applied to a polyimide film (Kapton 10011, manufactured by DU PONT-TORAY CO., LTD.) serving as a base, and a coating layer with a thickness of 40 μm was thus formed. Subsequently, the base and the coating layer were heated together using a drying machine held at 200° C. for 3 minutes to cure the coating layer and thus obtain an adhesive tape including the base and an adhesive layer placed on a surface of the base, the adhesive layer being formed from the applied adhesive composition.

Example 2

An adhesive tape was obtained in the same manner as in Example 1, except that the amount of the xylene solution of benzoyl peroxide to be mixed was changed to 1.5 parts by weight in terms of solid content.

Comparative Example 1

An adhesive tape was obtained in the same manner as in Example 1, except that the addition reaction-curable silicone rubber was not mixed.

Comparative Example 2

An adhesive tape was obtained in the same manner as in Example 1, except that the amount of the xylene solution of benzoyl peroxide to be mixed was changed to 2.1 parts by weight in terms of solid content and that the addition reaction-curable silicone rubber was not mixed.

Comparative Example 3

An adhesive tape was obtained in the same manner as in Example 1, except that the amount of the addition reaction-curable silicone rubber to be mixed was changed to 0.6 parts by weight.

Comparative Example 4

An adhesive tape was obtained in the same manner as in Example 1, except that the amount of the xylene solution of benzoyl peroxide to be mixed was changed to 1.5 parts by weight in terms of solid content and that the amount of the addition reaction-curable silicone rubber to be mixed was changed to 6.0 parts by weight.

In all of Example 2 and Comparative Examples 1 to 4, the concentration of the silicone adhesive composition obtained during the fabrication of the adhesive tape was 40 weight % as in Example 1.

Table 1 below shows the amounts of the organic peroxide curing agent and the addition reaction-curable silicone rubber mixed in the silicone adhesive compositions fabricated in Examples 1 and 2 and Comparative Examples 1 to 4 and also shows the results of evaluation of the properties of the adhesive tapes. It should be noted that the amounts of the organic peroxide curing agent and the addition reaction-curable silicone rubber in Table 1 are those calculated per 100 parts by weight of the total amount of the peroxide-curable silicone rubber, the silicone resin, and the partial condensates of the silicone rubber and the silicone resin in the toluene solution A.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The silicone adhesive composition according to the present invention can be used in the same applications as conventional silicone adhesive compositions. The adhesive tape according to the present invention can be used in the same applications as conventional adhesive tapes.

The invention claimed is:

1. A silicone adhesive composition consisting essentially of:
   100 parts by weight of a peroxide-curable silicone;
   1.2 to 3.2 parts by weight of an organic peroxide curing agent; and
   2 to 9 parts by weight of an addition reaction-curable silicone rubber, wherein
   the peroxide-curable silicone includes (1) at least one selected from the group consisting of a dimethylpolysiloxane which may optionally have a hydroxy group, and a partial condensate thereof and (2) and at least one selected from an MQ resin which is comprises an M unit and a Q unit, and a partial condensate thereof,
   the addition reaction-curable silicone rubber contains an addition-polymerizable group, and
   the silicone adhesive composition satisfies at least one of the following conditions: (a) a gel fraction of a cured product of the silicone adhesive composition is 40 to 60%; or (b) in an adhesive tape comprising a base and an adhesive layer placed on the base, the adhesive layer being formed from the silicone adhesive composition, an amount of peel in 90° direction is 0 (mm),

TABLE 1

| | Example 1 | Example 2 | Comparative Example 1 | Comparative Example 2 | Comparative Example 3 | Comparative Example 4 |
|---|---|---|---|---|---|---|
| Organic peroxide curing agent (parts by weight) | 1.6 | 2.5 | 1.6 | 3.5 | 1.6 | 2.5 |
| Additional reaction-curable silicone rubber (parts by weight) | 8.3 | 8.3 | 0 | 0 | 1.0 | 10 |
| Amount of displacement in shear direction in high-temperature environment (mm) | 0.2 | 0.1 | 0.9 | 0.1 | 0.7 | 0.1 |
| Amount of peel in 90° direction in high-temperature environment (mm) | 0 | 0 | 0 | 10 | 0 | 30 |
| Amount of displacement in shear direction in high-temperature environment (after storage; mm) | 0.2 | 0.1 | 0.8 | 0.1 | 0.6 | 0.1 |
| Amount of peel in 90° direction in high-temperature environment (after storage; mm) | 0 | 0 | 0 | 80 | 0 | 45 | wherein the amount of peel in 90° direction is determined by:
- (i) cutting the adhesive tape to obtain a 10-mm-wide test specimen;
- (ii) attaching the test specimen to a stainless steel plate so that an adhesive area is 10 mm×20 mm and one edge of the test specimen is not in contact with the stainless steel plate;
- (iii) applying a load of 20 g, acting in a direction perpendicular to the surface of the stainless steel plate, to the one edge of the test specimen;
- (iv) quickly heating the test specimen and the stainless steel plate to 250° C. and holding at 250° C. for 1 hour; and
- (v) evaluating an amount of peel of the test specimen.

* * * * *